(12) United States Patent
Kitazato et al.

(10) Patent No.: US 9,872,086 B2
(45) Date of Patent: Jan. 16, 2018

(54) RECEIVING APPARATUS, BROADCASTING APPARATUS, SERVER APPARATUS, AND RECEIVING METHOD

(71) Applicant: SONY CORPORATION, Tokyo (JP)

(72) Inventors: Naohisa Kitazato, Tokyo (JP); Jun Kitahara, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/915,944

(22) PCT Filed: Sep. 16, 2014

(86) PCT No.: PCT/JP2014/004754
§ 371 (c)(1),
(2) Date: Mar. 2, 2016

(87) PCT Pub. No.: WO2015/045324
PCT Pub. Date: Apr. 2, 2015

(65) Prior Publication Data
US 2016/0219346 A1  Jul. 28, 2016

(30) Foreign Application Priority Data

Sep. 30, 2013  (JP) ................................. 2013-204360

(51) Int. Cl.
*H04N 7/10* (2006.01)
*H04N 21/81* (2011.01)
(Continued)

(52) U.S. Cl.
CPC ........ *H04N 21/8173* (2013.01); *H04H 20/93* (2013.01); *H04H 60/37* (2013.01);
(Continued)

(58) Field of Classification Search
CPC ........... H04N 21/2353; H04N 21/2393; H04N 21/25841; H04N 21/4345; H04N 21/4348;
(Continued)

(56) References Cited

U.S. PATENT DOCUMENTS 5,996,015 A * 11/1999 Day ........................ H04L 29/06
348/E7.071

8,126,308 B2 * 2/2012 Shibata ................ G11B 27/031
386/232

(Continued)

FOREIGN PATENT DOCUMENTS

EP    2 797 023 A1   10/2014
JP    2001-204005 A   7/2001
(Continued)

OTHER PUBLICATIONS

"Hybrid Broadcast Broadband TV", ETSI (European Telecommunications Standards Institute), TS 102 796 V1.1.1, Jun. 2010, 75 pages.

(Continued)

*Primary Examiner* — An Son P Huynh
(74) *Attorney, Agent, or Firm* — Oblon, McClelland, Maier & Neustadt, L.L.P.

(57) ABSTRACT

This receiving apparatus includes a broadcast reception unit configured to receive a broadcasting signal including a broadcast program and tag information, the broadcast program including at least one scene, the tag information including information that is transmitted temporally corresponding to each of at least one scene of the broadcast program and is necessary for acquiring related information related to the broadcast program; an application controller configured to acquire an application that uses the related information and an application information table in which at least identification information for identifying the tag information including information for controlling an operation of the application and information for identifying the related information used by the application is described, and to control the operation of the application based on the application information table; a tag information processing unit configured to acquire the tag information based on the identification information described in the application information table from the received broadcasting signal, to acquire the related information based on the tag information, and to supply it to the application being executed.

8 Claims, 13 Drawing Sheets

(51) Int. Cl.
*H04H 20/93* (2008.01)
*H04H 60/37* (2008.01)
*H04H 60/43* (2008.01)
*H04N 21/434* (2011.01)
*H04N 21/4722* (2011.01)
*H04N 21/84* (2011.01)
*H04N 21/845* (2011.01)
*H04N 21/235* (2011.01)
*H04N 21/239* (2011.01)
*H04N 21/258* (2011.01)
*H04N 21/435* (2011.01)
*H04N 21/437* (2011.01)
*H04N 21/442* (2011.01)

(52) U.S. Cl.
CPC ........ *H04H 60/43* (2013.01); *H04N 21/2353* (2013.01); *H04N 21/2393* (2013.01); *H04N 21/25841* (2013.01); *H04N 21/435* (2013.01); *H04N 21/437* (2013.01); *H04N 21/4345* (2013.01); *H04N 21/4348* (2013.01); *H04N 21/44236* (2013.01); *H04N 21/4722* (2013.01); *H04N 21/84* (2013.01); *H04N 21/8456* (2013.01)

(58) Field of Classification Search
CPC .............. H04N 21/435; H04N 21/437; H04N 21/4722; H04N 21/8173; H04N 21/84; H04N 21/8456; H04H 20/93; H04H 60/43; H04H 60/37
See application file for complete search history.

(56) References Cited

U.S. PATENT DOCUMENTS

| | | | | |
|---|---|---|---|---|
| 8,955,021 B1* | 2/2015 | Treder | ............ | H04N 21/47217 386/239 |
| 9,253,533 B1* | 2/2016 | Morgan | ........... | H04N 21/44008 |
| 2001/0001160 A1* | 5/2001 | Shoff | ................ | H04N 5/44543 725/51 |
| 2002/0120934 A1* | 8/2002 | Abrahams | .............. | G06Q 30/06 725/60 |
| 2002/0162118 A1* | 10/2002 | Levy | ...................... | H04N 7/088 725/110 |
| 2003/0154486 A1* | 8/2003 | Dunn | ................. | H04N 7/17336 725/91 |
| 2003/0188321 A1* | 10/2003 | Shoff | ....................... | G06T 7/00 725/135 |
| 2005/0204385 A1* | 9/2005 | Sull | ................... | G06F 17/30817 725/45 |
| 2005/0257130 A1* | 11/2005 | Ito | ....................... | H04N 5/44591 715/205 |
| 2007/0003223 A1* | 1/2007 | Armstrong | ............ | G11B 19/025 386/217 |
| 2007/0091919 A1* | 4/2007 | Sandoval | .............. | H04N 21/235 370/466 |
| 2007/0157209 A1* | 7/2007 | Hashimoto | ........... | G06F 9/5011 718/104 |
| 2007/0220564 A1* | 9/2007 | Yano | .................... | H04N 21/235 725/86 |
| 2008/0065693 A1* | 3/2008 | Malik | ..................... | H04H 60/37 |
| 2008/0075419 A1* | 3/2008 | Okubo | ................. | G11B 27/002 386/332 |
| 2008/0235087 A1* | 9/2008 | Amento | ................. | G06Q 30/02 705/14.54 |
| 2008/0235723 A1* | 9/2008 | Park | ....................... | H04H 60/73 725/32 |
| 2008/0294636 A1* | 11/2008 | Kim | ....................... | H04N 7/173 |
| 2009/0003389 A1* | 1/2009 | Joung | ................. | H04L 12/56 370/509 |
| 2009/0007200 A1* | 1/2009 | Amento | ................. | H04N 7/173 725/100 |
| 2009/0013351 A1* | 1/2009 | Liao | .................... | H04N 7/17318 725/39 |
| 2009/0092374 A1* | 4/2009 | Kulas | ..................... | H04N 7/173 386/248 |
| 2009/0133062 A1* | 5/2009 | Park | ....................... | H04N 21/235 725/39 |
| 2009/0138906 A1* | 5/2009 | Eide | .................. | G06F 17/30038 725/32 |
| 2009/0164460 A1* | 6/2009 | Jung | .................. | G06F 17/30793 |
| 2009/0193456 A1* | 7/2009 | Ahn | ....................... | H04H 20/10 725/32 |
| 2009/0222854 A1* | 9/2009 | Cansler | ............... | H04N 7/17318 725/35 |
| 2010/0154007 A1* | 6/2010 | Touboul | ................. | G06Q 30/02 725/60 |
| 2010/0251295 A1* | 9/2010 | Amento | ............... | G11B 27/034 725/38 |
| 2011/0016171 A1* | 1/2011 | Kim | .................... | H04N 21/4586 709/203 |
| 2011/0093895 A1* | 4/2011 | Lee | ..................... | H04N 21/4432 725/40 |
| 2011/0154200 A1* | 6/2011 | Davis | ................... | H04N 21/235 715/716 |
| 2012/0120296 A1* | 5/2012 | Roberts | .............. | H04N 21/4126 348/333.12 |
| 2012/0189010 A1* | 7/2012 | Lee | ....................... | H04L 65/4076 370/392 |
| 2012/0227073 A1* | 9/2012 | Hosein | ............... | H04N 21/4126 725/60 |
| 2013/0007807 A1* | 1/2013 | Grenville | ........... | H04N 21/4314 725/44 |
| 2013/0036442 A1* | 2/2013 | Wingert | ........... | H04N 21/42209 725/60 |
| 2013/0047178 A1* | 2/2013 | Moon | ................. | H04N 21/4122 725/25 |
| 2014/0064706 A1* | 3/2014 | Lewis, II | ................ | H04N 5/93 386/278 |
| 2014/0082655 A1* | 3/2014 | Moon | ................. | H04N 21/462 725/27 |
| 2014/0089994 A1* | 3/2014 | Fujisawa | ........... | H04N 21/443 725/86 |
| 2014/0090000 A1* | 3/2014 | Takechi | ................ | H04H 60/43 725/110 |
| 2014/0090005 A1* | 3/2014 | Fujisawa | ........... | H04H 20/93 725/131 |
| 2014/0096154 A1* | 4/2014 | Ohtake | .............. | H04N 21/2585 725/31 |
| 2014/0201800 A1* | 7/2014 | Kitahara | ................ | H04H 20/28 725/116 |
| 2014/0237529 A1* | 8/2014 | Kitahara | ........... | H04N 21/23617 725/109 |
| 2014/0344884 A1* | 11/2014 | Kitahara | ................ | H04H 20/93 725/116 |
| 2015/0052224 A1* | 2/2015 | Kitahara | ............ | H04N 21/4126 709/219 |
| 2016/0165276 A1* | 6/2016 | Toma | ..................... | H04H 20/93 725/116 |

FOREIGN PATENT DOCUMENTS

| | | |
|---|---|---|
| JP | 2006-270869 A | 10/2006 |
| JP | 2012-257232 | 12/2012 |
| JP | 2013-150089 A | 8/2013 |
| WO | WO 2013/094110 A1 | 6/2013 |

OTHER PUBLICATIONS

International Search Report dated Dec. 22, 2014 in PCT/JP14/04754 Filed Sep. 16, 2014.
Extended European Search Report dated Apr. 4, 2017 in European Application No. 14848218.5 (10 pages).
Per Moberg: "UPTEC IT 13 001 Event-driven interactivity in application-based TV-programs", Feb. 28, 2013 (Feb. 28, 2013), XP055359156, Retrieved from the Internet: URL:http://uu.diva-

(56) References Cited

OTHER PUBLICATIONS portal.org/smash/get/diva2:608390/FULLTEXT01.pdf [retrieved on Mar. 27, 2017] (50 pgs.).
"Hybrid Broadcast Broadband TV—ETSI TS 102 796 V1.2.1 (Nov. 2012)", Nov. 1, 2012 (Nov. 1, 2012), XP055177671, Retrieved from the Internet: URL:http://www.etsi.org/deliver/etsi_ts/10 2700_ 102799/102796/01.02.01_60/ts_102796v0 10201p.pdf [retrieved on Mar. 18, 2015] (88 pgs.).

\* cited by examiner

| field | | Description |
|---|---|---|
| app_Name | | Application name |
| application_Iidentifier | | ID for uniquely identifying application |
| application_Descriptor | | General descriptor commonly used by application |
| | type | Designate application type |
| | control_Code | Designate value of application_control_code |
| | visibility | Designate visibility of application |
| | service_Bound | Flag representing whether or not it is valid only in current service |
| | priority | Represent priority of application |
| | version | Version of application |
| | mhp_Version | Version depending on platform profile |
| | icon | Designate icon |
| | storage_Capability | Capability of storage function |
| application_Transport | | Transport protocol descriptor |
| application_Location | | Application location descriptor |
| application_Boundary | | Application boundary descriptor |
| application_Specific_Descriptor | | Application specific descriptor |
| application_Usage_Descriptor | | Application usage descriptor |
| application_Mode_Descriptor | | Descriptor representing mode of application |
| application_Hash_Descriptor | | Hash value of application |

FIG.2

| application_mode_descriptor | | |
|---|---|---|
| | No. of Bits | Identifier |
| application_mode_descriptor(){ | | |
| descriptor_tag | 8 | uimsbf |
| descriptor_length | 8 | uimsbf |
| application_mode | 8 | uimsbf |
| number_of_affiliate_tag | 8 | uimsbf |
| for(i=0;i<number_of_affiliate_tag;i++){ | | |
| affiliate_tag_id | 16 | uimsbf |
| } | | |
| } | | |

FIG.3

| application_hash_descriptor | No. of Bits | Identifier |
|---|---|---|
| application_hash_descriptor() { | | |
| descriptor_tag | 8 | uimsbf |
| descriptor_length | 8 | uimsbf |
| hash_algorithm | 8 | uimsbf |
| hash_value_length | 8 | uimsbf |
| for(i=0; i<N; i++) { | | |
| hash_value_byte | 8 | uimsbf |
| } | | |
| } | | |

FIG.4

| Code | Identification name | Meaning |
|---|---|---|
| 0x00 | | reserved_future_use |
| 0x01 | AUTOSTART | Application is automatically activated when service is selected (except that application has already been executed). |
| 0x02 | PRESENT | Represent that application is in executable state during selection of service. It should be noted that application is not automatically activated. |
| 0x03 | DESTROY | Application terminates processing. |
| 0x04 | KILL | Application immediately terminates processing. |
| 0x05 | PREFETCH | Application file group is cached if receiver is able to do so. Application is not started. |
| 0x06 | REMOTE | Represent that application is not in current transport stream, and can be acquired in case where another stream is selected. |
| 0x07 | DISABLED | Represent that application cannot be activated. |
| 0x08 | PLAYBACK_AUTOSTART | Application is activated in same way as that of AUTOSTART in case where receiver performs reproduction from storage. |
| 0x09 to 0xFF | | reserved_future_use |

FIG.5

| Data structure | Number of bits | Bit sequence notation |
|---|---|---|
| affiliate_information_section(){ | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    affiliate_tag_id | 16 | uimsbf |
|    reserved_future_use | 2 | uimsbf |
|    version_number | 5 | uimsbf |
|    current_next_indicator | 1 | |
|    section_number | 8 | uimsbf |
|    last_section_number | 8 | uimsbf |
|    affiliate_token_flag | 1 | bslbf |
|    reserved_future_use | 7 | bslbf |
|    if(affliate_token_flag==1){ | | |
|       affiliate_token | 64 | uimsbf |
|    } | | |
|    reserved_future_use | 4 | bslbf |
|    descriptor_loop_length | 12 | uimsbf |
|    for(i=0;i<N;i++){ | | |
|       descriptor() | | |
|    } | | |
| } | | |

FIG.9

| Data structure | Number of bits | Bit sequence arrangement |
|---|---|---|
| transport_protocol_descriptor(){ | | |
|     descriptor_tag | 8 | uimsbf |
|     descriptor_length | 8 | uimsbf |
|     protocol_id | 16 | uimsbf |
|     transport_protocol_label | 8 | uimsbf |
|     for(i=0;i<N;i++){ | | |
|         selector_byte | 8 | uimsbf |
|     } | | |
| } | | |

FIG.10

| Data structure | Number of bits | Bit sequence arrangement |
|---|---|---|
| remote_connection | 1 | bslbf |
| reserved_future_use | 7 | bslbf |
| If(remote_connection=="1"){ | | |
|     original_network_id | 16 | uimsbf |
|     transport_stream_id | 16 | uimsbf |
|     service_id | 16 | uimsbf |
| } | | |
| component_tag | 8 | uimsbf |
| } | | |

FIG.11

| Data structure | Number of bits | Bit sequence arrangement |
|---|---|---|
| for(i=0;i<N;i++){ | | |
|    URL_base_length | 8 | uimsbf |
|    for(j=0;j<N;j++){ | | |
|       URL_base_byte | 8 | uimsbf |
|    } | | |
|    URL_extension_count | 8 | uimsbf |
|    for(j=0;j<URL_extension_count;j++){ | | |
|       URL_extension_length | 8 | uimsbf |
|       for(k=0;k<URL_extension_length;k++){ | | |
|          URL_extension_byte | 8 | uimsbf |
|       } | | |
|    } | | |
| } | | |

FIG.12

```
<affiliate_info number="10">
    <affiliate_tag id="1000">
      <affiliate_token>6fe8530cb967aac8</affiliate_token>
      <affiliate_info_transport type="HTTPTransportType">
        <url_base>https://www.xbc.co.jp</url_base>
      </affiliate_info_transport>
    </affiliate_tag>
    <affiliate_tag id="2000">
      ....................
    </affiliate_tag>
    ..................................

</affiliate_info>
```

FIG.13

RECEIVING APPARATUS, BROADCASTING APPARATUS, SERVER APPARATUS, AND RECEIVING METHOD

TECHNICAL FIELD

The present technology relates to a receiving apparatus, a broadcasting apparatus, a server apparatus, and a receiving method which are capable of using an application management table to execute an application.

BACKGROUND ART

In recent years, a technology that is capable of reproducing broadcast content and executing an application delivered via a network such as the Internet has been known. As such a technology, a technology called Hybrid Broadcast Broadband TV (hereinafter, referred to as HbbTV) has been known. As the standards of HbbTV, "ETSI TS 102 796" (see Non-Patent Document 1) is designed in Europe. On the other hand, in Japan, the standards corresponding to this, "ARIB STD-B24 ($4^{th}$ edition)," (see Non-Patent Document 2) is designed.

In the system in which the reproduction of broadcast content and execution of an application are simultaneously performed, such as the HbbTV, a life cycle of the application from activation to termination is managed with a data structure called AIT (Application Information Table) section superimposed on the broadcast content. The information terminal that has acquired the AIT section controls the application based on an application control code included in the AIT section.

In addition, there exists an XML-AIT described in an XML format as the optimal format for providing information related to the application to a receiver using a communication network such as the Internet, which has information equivalent to the broadcast AIT section.

CITATION LIST

Non-Patent Document

Non-Patent Document 1: ETSI (European Telecommunications Standards Institute) "ETSI TS 102 796 V1.1.1 (2010-06)" http://www.etsi.org/deliver/etsi_ts/102700_102799/102796/01.01.01_60/ts_102796v010101p.pdf (browsed on Oct. 21, 2011)

Non-Patent Document 2: Association of Radio Industries and Businesses "Data Coding and Transmission Specification for Digital Broadcasting, standards, ARIB STD-B24, Version 5.8" http://www.arib.or.jp/english/html/overview/doc/2-STD-B24v5_8-2p3-2.pdf (browsed on Jul. 3, 2013)

SUMMARY OF INVENTION

Problem to be Solved by the Invention

In the future, employers other than a broadcast station, such as application employers including a terminal manufacturer and a third party, are expected to provide an application that uses a broadcast program in some way. However, in actually operating a service that uses the application provided by the application employer, there are still various problems to be solved, and countermeasures are desired.

It is an object of the present technology to provide a receiving apparatus, a broadcasting apparatus, a server apparatus, and a receiving method with which the quality of a service using an application that uses a broadcast resource can be improved.

Means for Solving the Problem

In order to solve the above-mentioned problems, the receiving apparatus according to the present technology includes a broadcast reception unit configured to receive a broadcasting signal including a broadcast program and tag information, the broadcast program including at least one scene, the tag information including information that is transmitted temporally corresponding to each of at least one scene of the broadcast program and is necessary for acquiring related information related to the broadcast program, an application controller configured to acquire an application that uses the related information and an application information table in which at least identification information for identifying the tag information including information for controlling an operation of the application and information for identifying the related information used by the application is described, and to control the operation of the application based on the application information table, a tag information processing unit configured to acquire the tag information based on the identification information described in the application information table from the received broadcasting signal, to acquire the related information based on the tag information, and to supply it to the application being executed.

In the receiving apparatus, the tag information may include channel identification information for identifying a transmission channel of the related information, and the tag information processing unit may be configured to acquire the related information from the transmission channel identified by the channel identification information.

In the receiving apparatus, the tag information may include location information on a network of the related information, and the tag information processing unit may be configured to acquire the related information based on the location information.

In the receiving apparatus, a first representative value representative of the application may be described in the application information table and an electronic signature may be attached to the application information table, the first representative value being determined by predetermined calculation from the application, and the application controller may be configured to verify the electronic signature attached to the acquired application information table.

The broadcasting apparatus according to the present technology includes a broadcast unit configured to transmit a broadcasting signal including a broadcast program and tag information, the broadcast program including at least one scene, the tag information including information that is transmitted temporally corresponding to each of at least one scene of the broadcast program and is necessary for acquiring related information related to the broadcast program.

The server apparatus according to the present technology includes a storage unit configure to store an application that uses related information of a broadcast program transmitted by broadcasting and an application information table in which at least identification information for identifying tag information including information that is transmitted temporally corresponding to each of at least one scene of the broadcast program and is necessary for acquiring related information related to the broadcast program is described, and a delivery unit configured to deliver the application and the application information table stored in the storage unit via a network in response to a request from a reception terminal used by a user.

The receiving method based on another aspect of the present technology includes receiving, by a broadcast reception unit, a broadcasting signal including a broadcast program and tag information, the broadcast program including at least one scene, the tag information including information that is transmitted temporally corresponding to each of at least one scene of the broadcast program and is necessary for acquiring related information related to the broadcast program, acquiring, by an application controller, an application that uses the related information and an application information table in which at least identification information for identifying the tag information including information for controlling an operation of the application and information for identifying the related information used by the application is described, and controlling the operation of the application based on the application information table, acquiring, by a tag information processing unit, the tag information based on the identification information described in the application information table from the received broadcasting signal, acquiring the related information based on the tag information, and supplying it to the application being executed.

Effects of the Invention

As described above, according to the present technology, it is possible to improve the quality of a service using an application that uses a broadcast resource.

BRIEF DESCRIPTION OF DRAWINGS

FIG. 2 A diagram showing a data structure of an XML-AIT according to this embodiment.

FIG. 3 A diagram showing a data structure of an application mode descriptor 121.

FIG. 4 A diagram showing a data structure of an application hash descriptor 122.

FIG. 5 A diagram showing the definition of an application control code (controlCode) 23 stored in the XML-AIT.

FIG. 9 A diagram showing a data structure of the affiliate tag transmitted in a section format.

FIG. 10 A diagram showing a data structure of a transmission protocol descriptor (transport_protocol_descriptor).

FIG. 11 A diagram showing a data structure of a selector byte in a data carousel transmission.

FIG. 12 A diagram showing a data structure of a selector byte in the case where the transmission protocol is HTTP/HTTPS.

FIG. 13 An example of a format in the case where the affiliate tag is transmitted by a data carousel method or FLUTE as a file in an XML format.

MODE(S) FOR CARRYING OUT THE INVENTION

Hereinafter, embodiments of the present technology will be described with reference to the drawings.

First Embodiment

Information Processing System

Figure 1:
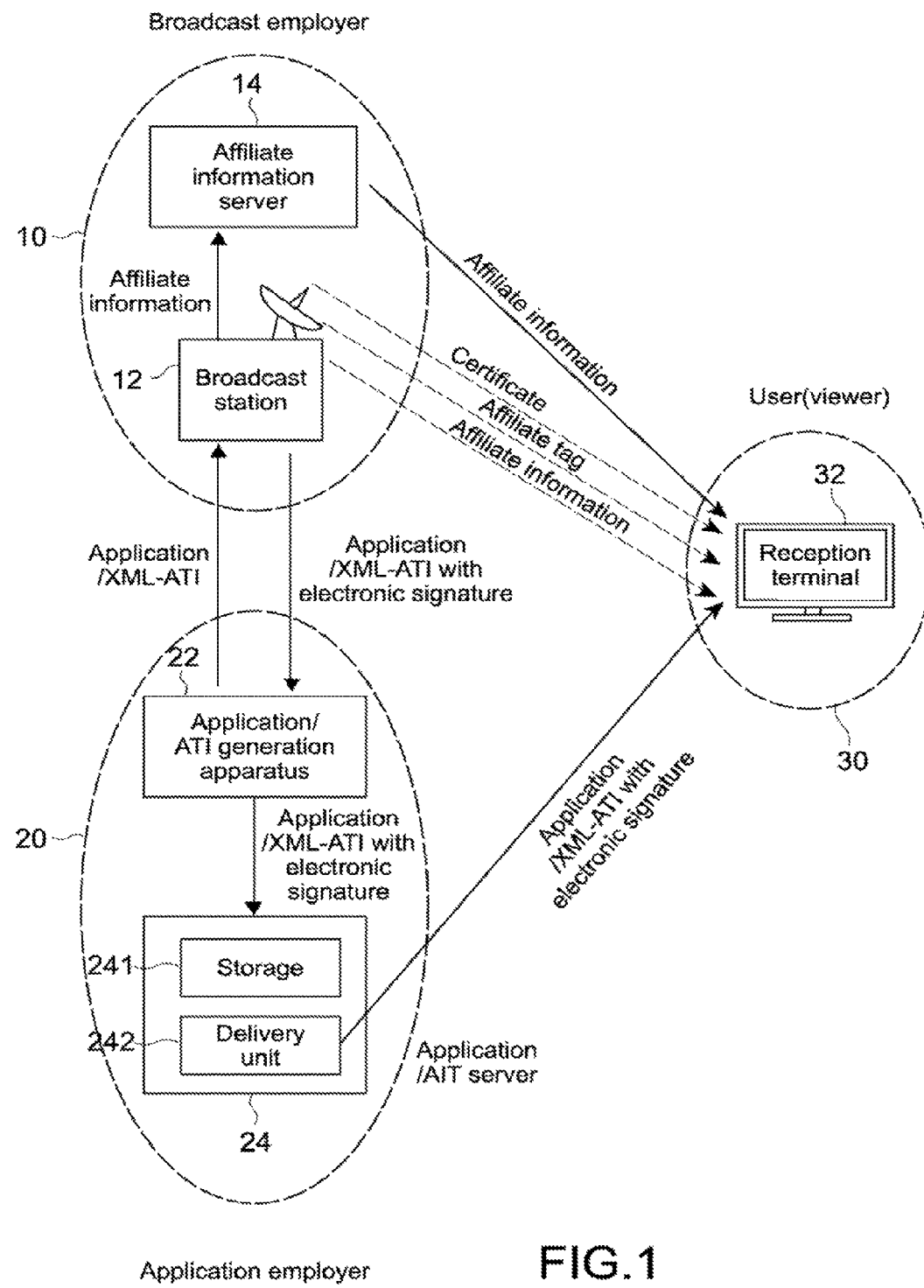
FIG. 1 A diagram showing an overview of an information processing system according to this embodiment.

FIG. 1 is a diagram showing an overview of an information processing system 1 according to this embodiment.

In the information processing system 1 according to this embodiment, a broadcast employer 10, an application employer 20, and a user 30 are exist as entities.

The broadcast employer 10 includes a broadcast station 12 and an affiliate information server 14.

The broadcast station 12 has a broadcast facility, and transmits a digital broadcast signal via a communication medium such as ground waves, satellite waves, and an IP (Internet Protocol) network, for example. The broadcast station 12 transmits a so-called broadcast stream superimposed with an AV stream multiplexed with transport streams such as video, audio, and caption, and data associated with the AV stream, for example. Examples of the data associated with the AV stream include AFT (Affiliate Tag Table), FLUTE, and data carousel.

The affiliate information server 14 is used by the application executed in a reception terminal 32 used by the user 30, and stores affiliate information being information related to a scene of the broadcast program. The affiliate information server 14 is configured to return corresponding affiliate information via a network, in response to a request from the reception terminal 32 of the user 30.

The application employer 20 includes an application/AIT generation apparatus 22 and an application/AIT server 24.

The application/AIT generation apparatus 22 is an apparatus for generating an application and an XML-AIT (Extensible Markup Language-Application Information Table) in which information for controlling the operation of the application has been described, for example. The application/AIT generation apparatus 22 more specifically includes a calculator such as a personal computer, and a program executed on the calculator.

The application/AIT server 24 includes a storage 241 storing an application that is generated by the application/AIT generation apparatus 22 and is added with an electronic signature by the application employer 20, and an XML-AIT file, and a delivery unit 242 delivering a corresponding application and a corresponding XML-AIT file via a network in response to a request from the reception terminal 32 of the user 30.

It should be noted that the application/AIT server 24 may include two servers of an application server and an AIT server. The application/AIT server 24 has a hardware configuration of a typical computer, such as a CPU, a main memory, a data storage apparatus, and a user interface, and a program for the respective server.

The reception terminal 32 of the user 30 includes, for example, a personal computer, a mobile phone, a smartphone, a television receiver, a game machine, a tablet terminal, or an audio/video reproduction apparatus, but does not need to take a specific product type.

The reception terminal 32 of the user 30 receives the digital broadcast signal from the broadcast station 12, and demodulates it to acquire a transport stream. The reception terminal 32 is capable of separating a broadcast stream from the transport stream, decoding it, and outputting the decoded stream to a display unit (not shown) and speaker unit (not shown) mounted on or connected to the reception terminal 32, or to a recording apparatus (not shown).

Moreover, the reception terminal 32 of the user 30 acquires an XML-AIT file and an application from the application/AIT server 24. In more detail, the reception terminal 32 is configured to acquire an XML-AIT file first, and then acquire an application based on the URL representing the place of the application described in the XML-AIT.

It should be noted that although an affiliate information file is arranged on the affiliate information server 14 and is transmitted to the reception terminal 32 via a network in the above-description, the affiliate information may be transmitted to the reception terminal 32 by broadcasting. As a protocol to transmit a file such as affiliate information by broadcasting, there exist FLUTE (File Delivery over Unidirectional Transport) being a protocol for file delivery in an IP multicast environment, and data carousel, for example.

[Application]

Now, the application provided from the application employer 20 will be described supplementarily. The application includes, for example, an HTML (Hyper Text Markup Language) document, a BML (Broadcast Markup Language) document, an MHEG (Multimedia and Hypermedia information coding) document, Java (registered trademark) script, a still image file, and a moving image file.

The application may be a visible one or invisible one. The visible application is an application whose state can be viewed by a user via a screen. The invisible application is an application whose state cannot be viewed by a user via a screen. In addition, the application may be a bidirectional application that is capable of changing the information to be presented or function in accordance with the user's operation on the reception terminal 32, or an application that presents information for the user from one direction.

[Data Structure of XML-AIT]

Next, the data structure of the XML-AIT employed in this embodiment will be described.

FIG. 2 is a diagram showing the data structure of the XML-AIT according to this embodiment.

The XML-AIT stores, for each application, an application name (app Name), an application identifier (application_Iidentifier), an application descriptor (application_Descriptor), an application type (type), an application control code (control_Code) 123, the visibility of the application, a flag representing whether or not it is valid only in the current service (service_Bound), the priority of the application (priority), the version of the application (version), the version depending on the platform profile (mhp_Version), an icon (icon), the capability of the storage function (storage_Capability), a transport protocol descriptor (application_Transport), an application location descriptor (application_Location), an application boundary descriptor (application_Boundary), an application specific descriptor (application_Specific_Descriptor), an application usage descriptor (application_Usage_Descriptor), an application mode descriptor (application_Mode_Descriptor) 121, an application hash descriptor (application_Hash_Descriptor) 122, and the like.

To the XML-AIT, an electronic signature for detecting falsification is attached. As the electronic signature, an XML signature is used, for example. The format of the XML signature may be any one of a detached signature independent of the XML-AIT, an enveloping signature in the format of including the XML-AIT, and an enveloped signature in the format of being included in the XML-AIT. It should be noted that the detached signature is preferably employed to suppress the influence on the format of the XML-AIT.

In the XML-AIT employed in this embodiment, the application mode descriptor (Application Mode Descriptor) 121 that is a descriptor representing the mode of the application is provided.

FIG. 3 is a diagram showing the data structure of the application mode descriptor 121.

The application mode descriptor 121 includes a descriptor tag for identifying the application mode descriptor 121 (descriptor_tag), a descriptor length (descriptor_length), an application mode that represents the mode of the application (application_mode), the number of affiliate tags (number_of_affilate_tag), an affiliate tag ID (affiliate_tag_id), and the like.

The application mode is information for controlling the function (API: Application Program Interface) that can be used by the application. Examples of the function that is limited in use by the application include a broadcast resource presentation function that accesses various broadcast resources such as a broadcast program and data to present them. In more detail, the value of the application mode is set so that the broadcast resource presentation function can be used for the application that accesses the broadcast resource, and the value of the application mode is set so that the broadcast resource presentation function cannot be used for the application that does not accesses the broadcast resource. It should be noted that the function in which whether or not the function can be used is switched depending on the application mode is not limited to the broadcast resource presentation function.

For example, the application mode set for the application that accesses the broadcast resource is "mode 1," and the application mode set for the application that does not access the broadcast resource is "mode 2."

In this example, the application mode can be used as information for knowing the necessity for verification of the electronic signature in the reception terminal 32. Specifically, the reception terminal 32 determines that the verification of the electronic signature is not needed when the application mode is "mode 1," and that the verification of the electronic signature is needed when the application is "mode 2." It should be noted that it is only an operation form, and also the application that accesses the broadcast resource may need the verification of the electronic signature.

The number of affiliate tags represents the total number of affiliate tags.

The affiliate tag ID is identification information assigned to each affiliate tag delivered by broadcasting. The affiliate tag will be described later in detail.

FIG. 4 is a diagram showing the data structure of the application hash descriptor 122.

The application hash descriptor 122 includes a descriptor tag (descriptor_tag), a descriptor length (descriptor_length), a hash algorithm that represents how to calculate a hash value (hash_algorithm), a hash value length (hash_value_length), a hash value (hash_value_byte), and the like. The hash value is a hash value of the application, is a value generated from the substance of the application by a predetermined hash function, for example, and can be described as a value that is representative of the application. How to use the hash value will be described later.

[Definition of Application Control Code]

The life cycle of the application is dynamically controlled by a reception terminal based on the application control code 123 stored in the XML-AIT.

FIG. 5 is a diagram showing the definition of the application control code (controlCode) 123 stored in the XML-AIT.

As shown in the figure, "AUTOSTART," "PRESENT," "DESTROY," "KILL," "PREFETCH," "REMOTE," "DISABLED," and "PLAYBACK_AUTOSTART," exist as the application control code on the standards. The definition of these application control codes is as follows.

"AUTOSTART" is a code for instructing to automatically activate the application with the selection of service. However, it is not limited thereto in the case where the application has already been executed.

"PRESENT" is a code for instructing to make the application be in the executable state during the selection of the service. It should be noted that the target application is not automatically activated with the selection of service, but is activated in response to the user's instruction for activation.

"DESTROY" is a code for instructing to accept the termination of the application.

"KILL" is a code for instructing to forcibly terminate the application.

"PREFETCH" is a code for instructing to cache the application.

"REMOTE" is a code representing that the application cannot be acquired with the current transport stream. The application is acquired from another transport stream or cache, and thus can be made available.

"DISABLED" is a code representing that the activation of the application is prohibited.

"PLAYBACK_AUTOSTART" is a code for activating the application with the reproduction of broadcast content recorded in the storage (recording apparatus).

[Example of General Operation of Entire System]

Next, an example of the flow of general operation of the entire system will be described with reference to FIG. 1.

1. First, the application/AIT generation apparatus 22 of the application employer 20 generates an application and an XML-AIT for controlling the operation of the application. The generated application and XML-AIT are transmitted from the application employer 20 to the broadcast employer 10 for confirmation of the content.

2. The broadcast employer 10 (broadcast station 12) checks whether or not the application and XML-AIT supplied from the application employer 20 is allowed to be used in accordance with the predetermined evaluation criteria. The broadcast employer 10 (broadcast station 12) adds an electronic signature generated using a private key of the broadcast station 12 to each of the application and the XML-AIT if everything is satisfactory. The application and the XML-AIT to which the electronic signatures are added are sent back to the application employer 20.

3. The application employer 20 arranges the application and the XML-AIT on the application/AIT server 24, and makes them be in the state accessible from the reception terminal 32 via a network.

It should be noted that the delivery of the application and XML-AIT between the application employer 20 and the broadcast employer 10 (broadcast station 12) may be performed through a network, or performed by the delivery of a recording medium that can store electronic data.

4. On the other hand, the broadcast employer 10 (broadcast station 12) generates an affiliate information (affiliate_info) file, and arranges it on the affiliate information server 14 in the state accessible by the reception terminal 32. Here, the affiliate information is a data structure in which information related to a broadcast program, which is used by the application being executed in the reception terminal 32, temporally corresponding to at least a part of the scenes of the broadcast program, is stored. It should be noted that the specific data structure of the affiliate information (affiliate_info) is arbitrarily determined by the broadcast employer 10.

Examples of the related information that is assumed to be stored in the affiliate information (affiliate_info) include the following information;

a. Detailed information on the object such as a character, a matter, and a shop in a scene of the broadcast program;

b. Information for accessing the detailed information of the object;

c. Coordinate position information related to a scene (e.g., position of the news, position of a scene of a drama);

d. Program information corresponding to EPG;

e. Typical video or reduced video of a scene or cut;

f. Data of a chronological text of speech such as a script and narration in a program; and g. Other information held by the broadcast employer 10.

On the other hand, the application uses the above-mentioned related information to perform processing, and outputs the processing results. Assumed examples of the application include the following applications:

A. Application that acquires the detailed information of the object in a. above, and displays, on a screen, the detailed information of the object such as a character, a matter, and a shop designated by the user using a pointer in a scene;

B. Application that acquires the access information in b. above, accesses the detailed information of the object such as a character, a matter, and a shop designated by the user using a pointer in a scene based on the access information, and displays it on a screen;

C. Application that acquires the coordinate position information in c. above, and presents a position of the news, a position of a scene of a drama, or the like, to the user by displaying the position indicated by the coordinate position information on a map;

D. Application that acquires the program information corresponding to EPG in d. above, and displays a related web page by searching the web based on the program information;

E. Application that temporally lists typical video or reduced video of a scene or cut in e. above; and F. Application that acquires data of a chronological text of speech in a program in f. above, lists it in chronological order, and displays a related web page by searching the web based on data selected by the user from data of the listed text of speech.

In addition thereto, various applications are possible.

Now, return to the illustration of the flow of operation of the entire system.

5. The broadcast station 12 broadcasts a certificate storing a public key corresponding to the private key of the broadcast station 12. For the broadcasting of the certificate, a data carousel method is used, for example.

6. The reception terminal 32 acquires the XML-AIT corresponding to the broadcast program from the application/AIT server 24 by receiving an application execution instruction corresponding to the broadcast program from the user 30, for example. The reception terminal 32 further acquires an application from the application/AIT server 24 based on the location information of the application described in the XML-AIT. Furthermore, the reception terminal 32 acquires a certificate from the broadcasting signal, verifies the electronic signature of the XML-AIT by using the public key stored in the certificate, and ranks the acquired application as a reliable application if the verification succeeds.

7. The broadcast station 12 broadcasts the affiliate tag (affiliate_tag) by a data carousel method, for example, temporally corresponding to at least a part of scenes (each scene to which the above-mentioned affiliate information (affiliate_info) is related) of the broadcast program.

8. The reception terminal 32 detects an affiliate tag corresponding to the affiliate tag ID described in the acquired XML-AIT from the broadcasting signal, and acquires it.

9. The reception terminal 32 accesses the affiliate information server 14 based on, for example, the location information of the affiliate information file described in the acquired affiliate tag to acquire desired affiliate information.

10. The reception terminal 32 supplies the related information stored in the acquired affiliate information to the application. Accordingly, processing using the related information corresponding to a scene of the broadcast program is executed in the application.

It should be noted that although an affiliate information file is acquired from the affiliate information server 14 in this operation example, it may be possible to acquire affiliate information transmitted from the broadcasting signal. In this case, in the affiliate tag, information for identifying a broadcasting channel is described as information necessary for acquiring affiliate information.

In the above, the general operation of the entire system has been described.

Next, the configuration of the reception terminal 32 will be described, and then the operation of the information processing system 1 will be described in detail.

[Configuration of Reception Terminal 32]

Figure 6:
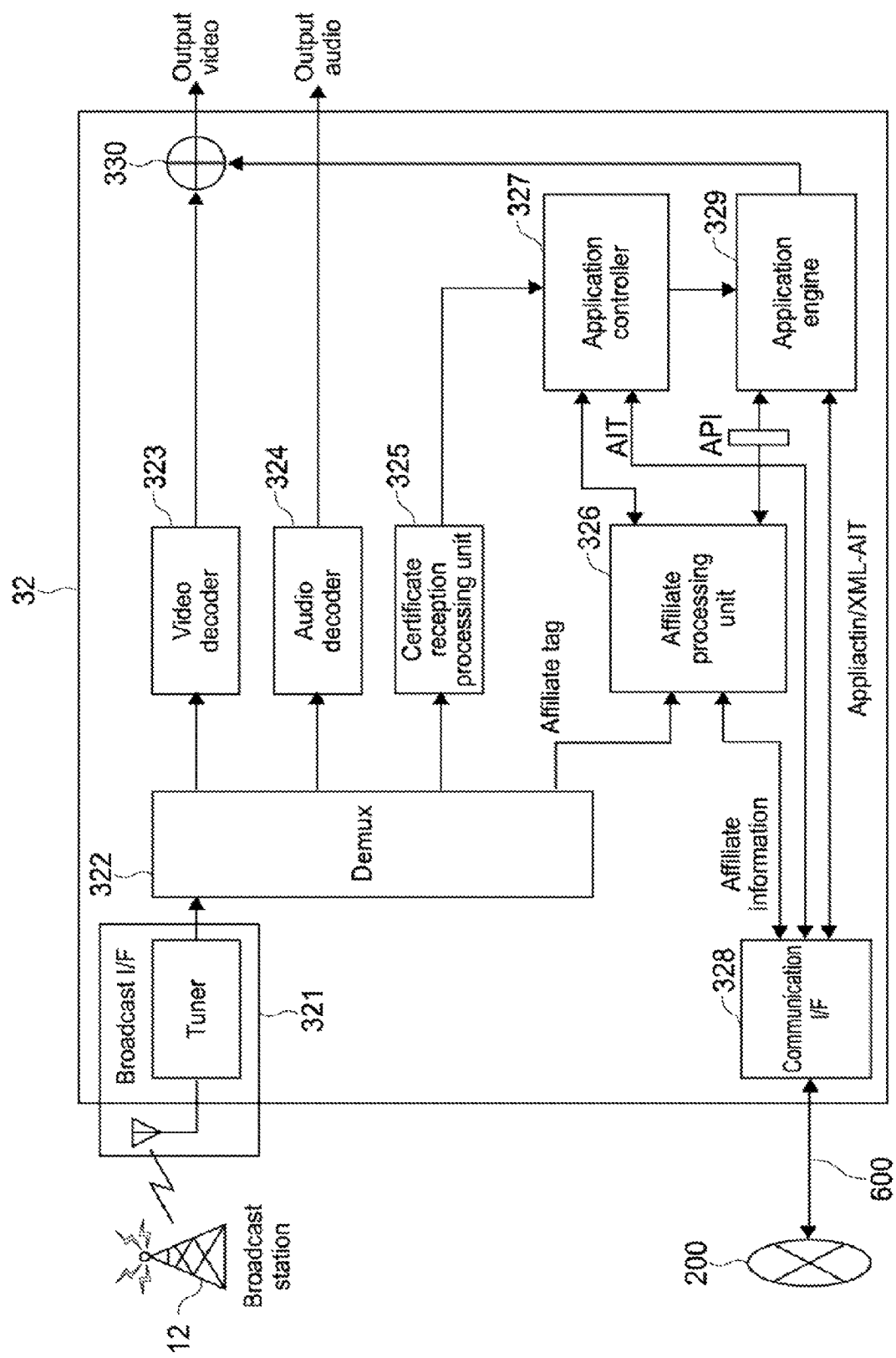
FIG. 6 A block diagram showing the configuration of a reception terminal 32 according to this embodiment.

FIG. 6 is a block diagram showing the configuration of the reception terminal 32 according to this embodiment.

The reception terminal 32 includes a broadcast interface 321, a demultiplexer 322, a video decoder 323, an audio decoder 324, a certificate reception processing unit 325, an affiliate processing unit 326, an application controller 327, a communication interface 328, an application engine 329, and a movie combining unit 330.

The broadcast interface 321 includes an antenna and a tuner, and uses them to receive a digital broadcast signal selected by the user. The broadcast interface 321 outputs a transport stream acquired by performing demodulation processing on the received digital broadcast signal, for example, to the demultiplexer 322.

The demultiplexer 322 separates an affiliate tag and a certificate that are data in the format of video, audio, or section, and are multiplexed on TS (transport stream). Specifically, the demultiplexer 322 refers to PID (Packet ID) included in the TS packet constituting the TS, and outputs the ES (elementary stream) of video and the ES of the audio stream in the TS packet in the stream format, to the video decoder 323 and the audio decoder 324, respectively. In addition, the demultiplexer 322 outputs the packet storing an affiliate tag and the packet storing a certificate in the TS packet storing data in the section format, to the affiliate processing unit 326 and the certificate reception processing unit 325, respectively.

The video decoder 323 decodes the ES of video to generate a video signal, and outputs the generated video signal to the movie combining unit 330.

The audio decoder 324 decodes the ES of audio to generate an audio signal, and outputs the generated audio signal to an output processing unit (not shown).

The certificate reception processing unit 325 extracts data of the certificate from the packet of the certificate separated from the transport stream by the demultiplexer 322, and supplies it to the application controller 327.

The application controller 327 controls the activation, termination, and the like of the application in the application engine 329 in accordance with the XML-AIT. The application controller 327 acquires the XML-AIT being operation control information for the application by using the communication interface 328 from the application/AIT server 24 of the application employer 20. The application controller 327 acquires an application related to a desired broadcast program based on the location information described in the acquired XML-AIT by using the communication interface 328 from the application/AIT server 24 of the application employer 20, and controls it to activate in the application engine 329.

The application engine 329 is a platform for executing at least one application, and is specifically an HTML (Hyper-Text Markup Language) browser, for example. The application being executed in the application engine 329 instructs the affiliate processing unit 326 to detect an affiliate tag corresponding to the affiliate tag ID described in the XML-AIT from the broadcasting signal to acquire it. When receiving the response representing the completion of acquisition of the affiliate tag from the affiliate processing unit 326, the application instructs the affiliate processing unit 326 to acquire affiliate information subsequently. Then, the application being executed in the application engine 329 uses the related information stored in the affiliate information acquired by the affiliate processing unit 326 to perform predetermined processing.

The affiliate processing unit 326 detects an affiliate tag corresponding to the affiliate tag ID described in the XML-AIT from the packet of the affiliate tag separated from the transport stream by the demultiplexer 322. The affiliate processing unit 326 is configured to acquire affiliate information from the affiliate information server 14 or the broadcasting signal based on the information for acquiring the affiliate information described in the detected affiliate tag, and to returns it to the application executed in the application engine 329.

The communication interface 328 is an interface for communicating with external equipment via a network 200. The communication interface 328 can perform any of wired communication and wireless communication.

The movie combining unit 330 combines the video signal from the video decoder 323 with display data generated by the application being executed in the application engine 329, and outputs it to a recording apparatus (not shown), a display unit, and a speaker unit (not shown) connected to the reception terminal 32, for example.

At least a part of the configuration including at least the certificate reception processing unit 325, the affiliate processing unit 326, the application controller 327, and the application engine 329 of the reception terminal 32 includes a computer including a CPU (Central Processing Unit) and a memory, and a program that causes the computer to function as the reception terminal 32.

[Operation of Reception Terminal 32]

Next, the operation of the reception terminal 32 according to this embodiment will be described in detail.

Figure 7:
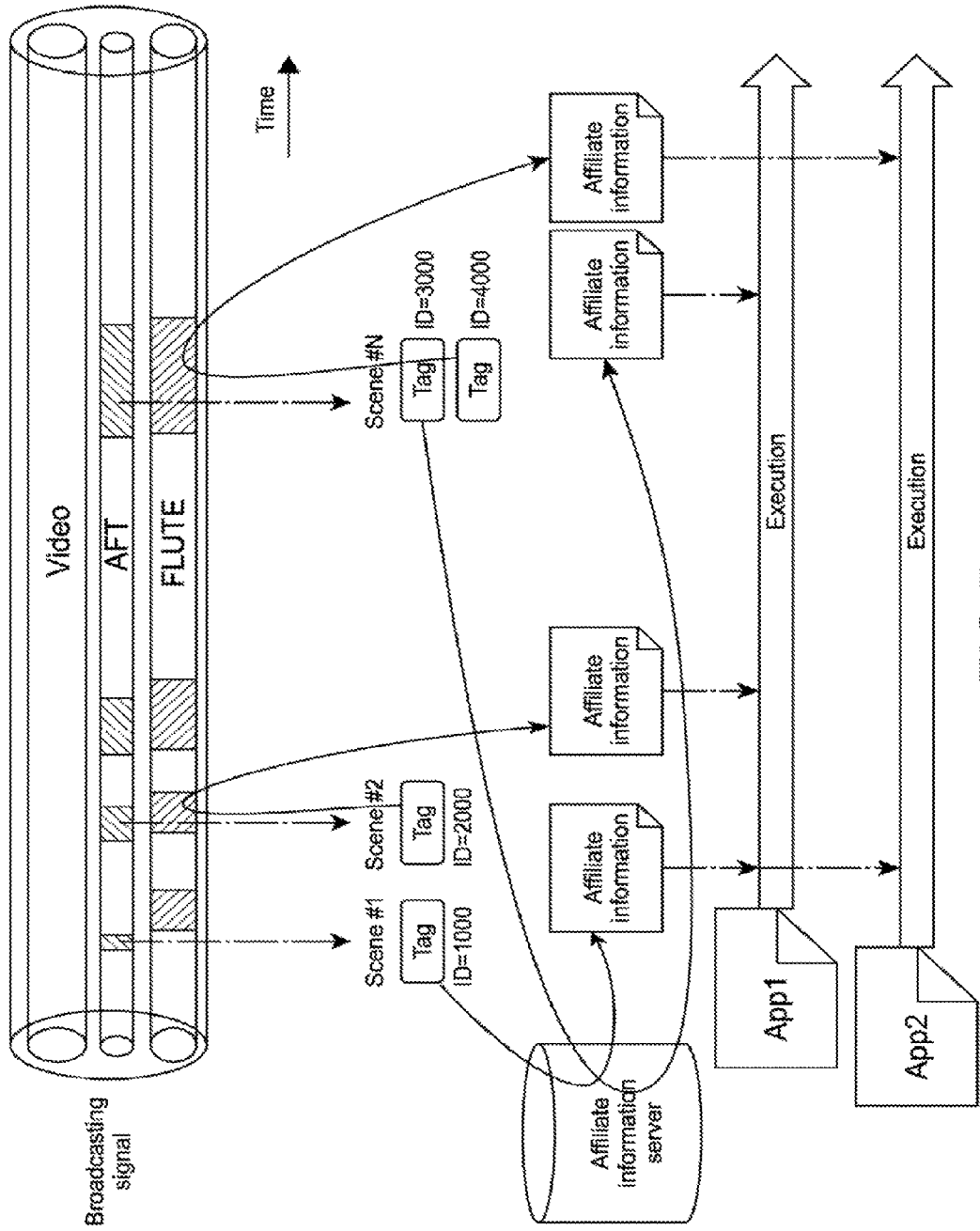
FIG. 7 A diagram showing a flow of acquiring an affiliate tag and affiliate information for each scene in the reception terminal 32.

FIG. 7 is a diagram showing a flow of acquiring an affiliate tag and affiliate information for each scene in the reception terminal 32.

Figure 8:
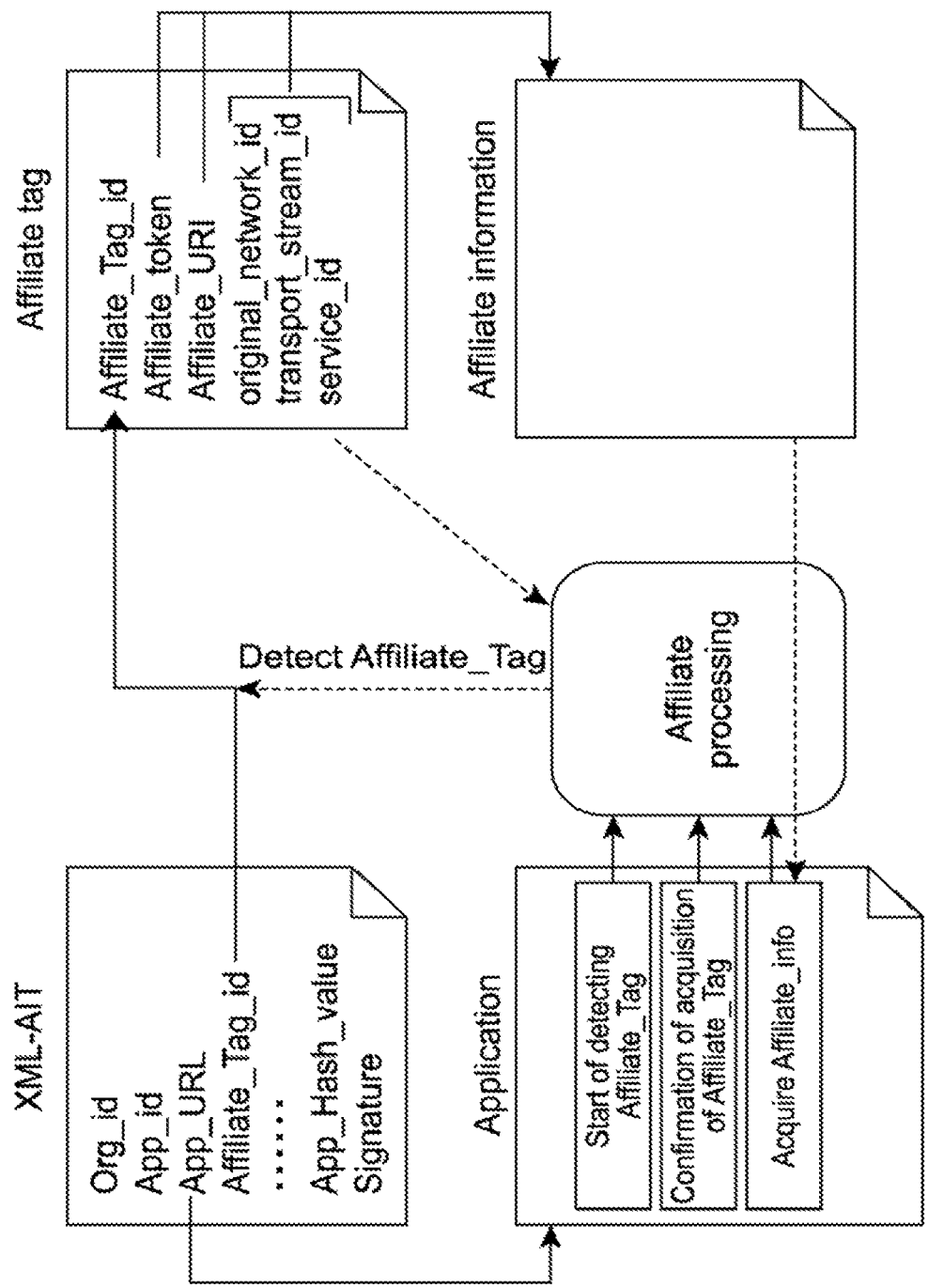
FIG. 8 A diagram showing the relationship between the XML-AIT, the application, the affiliate tag, and the affiliate information.

FIG. 8 is a diagram showing the relationship between the XML-AIT, the application, the affiliate tag, and the affiliate information.

For example, when receiving an instruction to execute the application corresponding to the broadcast program being viewed from the user 30, the application controller 327 uses the communication interface 328 to access the application/AIT server 24 of the application employer 20, and acquires the XML-AIT being operation control information of a desired application.

The application controller 327 acquires a desired application from the application/AIT server 24 based on the location information (e.g., App URL) of the application described in the acquired XML-AIT, and verifies the hash value and the electronic signature. It should be noted that the verification of the hash value and the electronic signature will be described later in detail. In the case where the verification of the hash value and the electronic signature succeeds, the application controller 327 activates the application on the application engine 329 in accordance with the application control code described in the XML-AIT.

Next, the application (e.g., App1 or app2 in FIG. 7) being executed in the application engine 329 instructs the affiliate processing unit 326 to detect an affiliate tag corresponding to the affiliate tag ID described in the XML-AIT from the broadcasting signal (FIG. 8: Start of detecting Affiliate_Tag).

The affiliate processing unit 326 detects an affiliate tag corresponding to the affiliate tag ID described in the XML-AIT from the packet of the affiliate tag separated from the transport stream by the demultiplexer 322.

The application being executed periodically makes an inquiry to the affiliate processing unit 326 about the completion of acquisition of the affiliate tag (FIG. 8: Confirmation of acquisition of Affiliate_Tag). When receiving a notification of the completion of acquisition from the affiliate processing unit 326, the application being executed instructs the affiliate processing unit 326 to acquire affiliate information subsequently. The affiliate processing unit 326 acquires affiliate information (FIG. 8: Acquire Affiliate_info) from the affiliate information server 14 or the broadcasting signal based on information (FIG. 8: Affiliate_token or Affiliate_URI) for acquiring the affiliate information described in the affiliate tag in accordance with the instruction.

As shown in FIG. 8, the affiliate tag includes, as information for acquiring affiliate information, information for acquiring an affiliate information file stored in the affiliate information server 14 (FIG. 8: Affiliate_token, Affiliate_URI), and channel information by which the affiliate information is transmitted through a broadcasting signal (FIG. 8: original_network_id, transport_stream_id, service_id).

Examples of the method of transmitting the affiliate tag include:

1. A method of transmitting the affiliate tag (AFT: Affiliate_tag_Table) in the section format;
2. A method of transmitting the affiliate tag in the file format of data carousel or FLUTE; and
3. A method of embedding the affiliate tag in the binary format in video data such as a user data area of MPEG2 Video and SEI of H264 for transformation.

[Data Structure of Affiliate Tag (affiliate_tag)]

Now, the data structure of the affiliate tag will be described.

FIG. 9 is a diagram showing the data structure of the affiliate tag transmitted in a section format.

In the affiliate tag (affiliate_tag) transmitted in a section format, a table ID (table_id), a section syntax identifier (section_syntax_indicator), a reservation for future use (reserved_future_use), a reservation (reserved), a section length (section_length), an affiliate tag ID (affiliate_tag_id), a version number (version_number), a current next instruction (current_next_indicator), a section number (section_number), a last section number (last_section_number), an affiliate token flag (affiliate_token_flag), an affiliate token (affiliate_token), an additional descriptor length (descriptor_loop_length), an additional descriptor (descriptor), and the like are described.

In the table ID of the affiliate tag, an ID that can be uniquely identified to be an affiliate tag table is described. The affiliate tag ID is an ID for identifying each affiliate tag.

The affiliate token flag is a flag indicating the existence or non-existence of the affiliate token.

The affiliate token is a secret code corresponding to the affiliate tag ID. The secret code is information determined so as to uniquely determine which affiliate information the access request is made for in the affiliate information server 14.

It should be noted that although it is desirable to use the affiliate token as information for acquiring an affiliate information file from the affiliate information server 14 to enhance the security, it is possible to use information at least for acquiring the affiliate information in the present technology. For example, it is possible to use general location information such as URL. Moreover, in the case where an affiliate information file broadcasted in a data carousel method or FLUTE is acquired, it is possible to indicate the absence of the affiliate token to the affiliate tag by the affiliate token flag, and describe the transmission channel information including original_network_id, transport_stream_id, service_id, and the like, as information for acquiring the affiliate information.

In the additional descriptor (descriptor), a transmission protocol descriptor (transport_protocol_descriptor) or the like can be described according to the purpose.

FIG. 10 is a diagram showing the data structure of the above-mentioned transmission protocol descriptor (transport_protocol_descriptor).

The transmission protocol descriptor includes a transmission protocol descriptor tag (descriptor_tag), a transmission protocol descriptor length (descriptor_length), a protocol ID (protocol_id), a transmission protocol label (transport_protocol_label), and a selector byte (selector_byte).

The transmission protocol descriptor tag indicates a protocol for transmitting the affiliate information. Examples of the transmission protocol include HTTP (Hypertext Transfer Protocol)/HTTPS (Hypertext Transfer Protocol Secure), data carousel transmission, and FLUTE.

The selector byte is an area in which a syntax is defined for each protocol ID.

FIG. 11 is a diagram showing the data structure of the selector byte in a data carousel transmission.

The selector byte in the data carousel transmission includes a remote connection (remote_connection), a reservation (reserved_future_use), an original network ID (original_network_id), a transport ID (transport_stream_id), a service ID (service_id), and a component tag (component_tag).

The remote connection is a value representing whether or not the affiliate tag and the affiliate information are transmitted in the same channel.

The original network ID, the transport ID, and the service ID are information that represents the channel through which the affiliate information is transmitted. The component tag is a value representing whether or not which stream in the channel is the affiliate information.

FIG. 12 is a diagram showing the data structure of the selector byte in the case where the transmission protocol is HTTP/HTTPS.

In the selector byte, at least one URL can be described.

FIG. 13 is an example of a format in the case where the affiliate tag is transmitted by a data carousel method or FLUTE as a file in an XML format.

Figure 14:
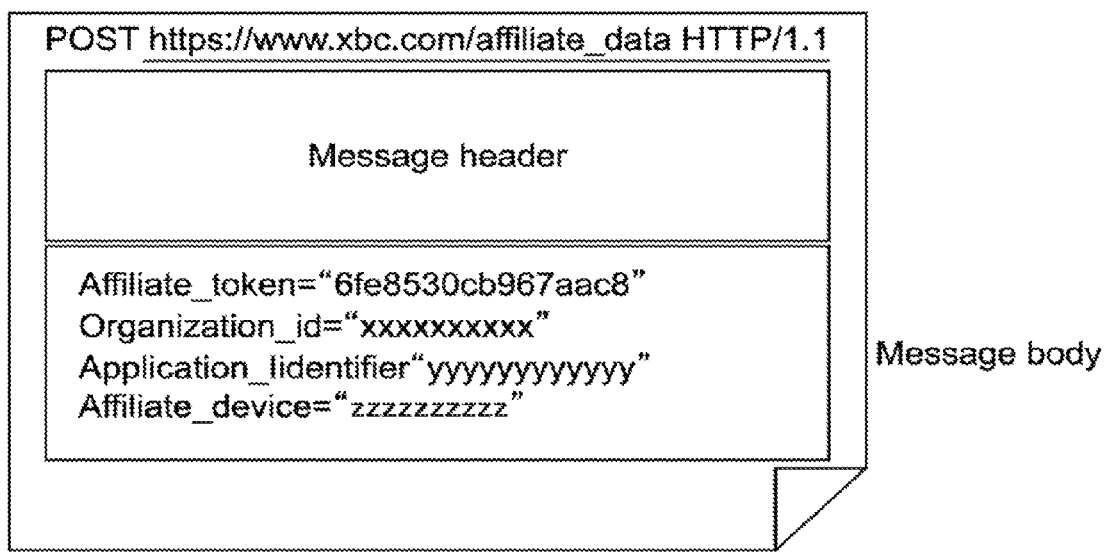
FIG. 14 An example of an HTTPS Post request for acquiring the affiliate information.

FIG. 14 is an example of an HTTPS Post request for acquiring the affiliate information.

In this example, the affiliate token is stored in a body portion of the HTTPS Post request. Because the body portion is encrypted in the SSL (Transport Layer Security), the affiliate token can be safely transmitted.

In the body portion, an employer ID (Organization_id) described in the XML-AIT, an application identifier (Application_Iidentifier), and a device identifier (Affiliate_device) are described. Accordingly, it is possible to store the application employer using a broadcast resource, the application, and the reception terminal in the affiliate information server 14 as a log, and to use them for volume charging for the application employer, the user, and the like.

(Generation and Verification of Electronic Signature and Hash Value)

Next, generation and verification of an electronic signature and a hash value will be described.

Figure 15:
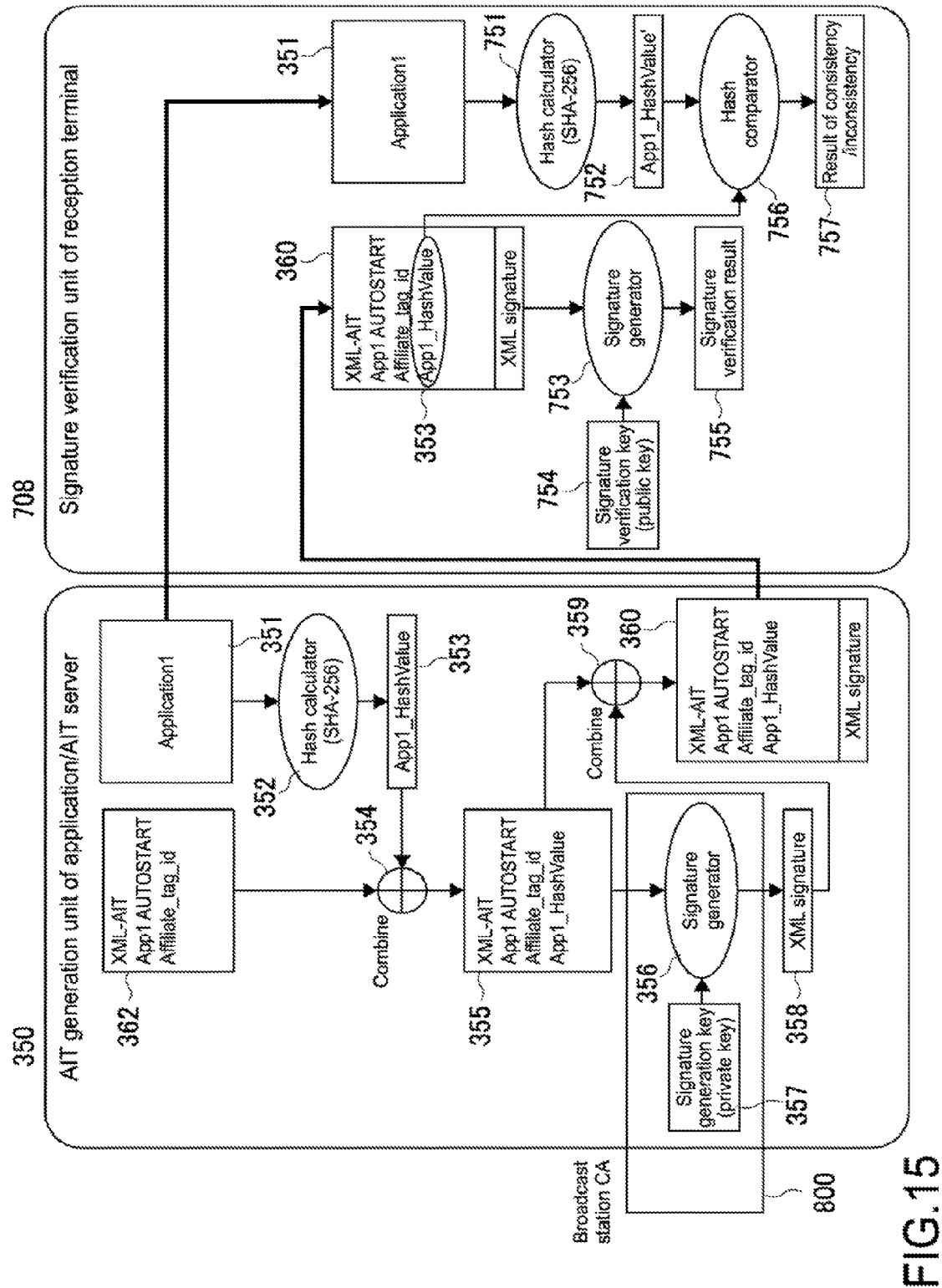
FIG. 15 A block diagram for explaining the mechanism for generating and verifying an electronic signature and a hash value.

FIG. 15 is a block diagram for explaining the mechanism for generating and verifying an electronic signature and a hash value.

The application/AIT server 24 includes an AIT generation unit 350. The AIT generation unit 350 is specifically realized by a program that is loaded into a main memory and generates an electronic signature and a hash value, and a CPU that executes the program.

The AIT generation unit 350 performs the following processing.

1. The AIT generation unit 350 uses a predetermined hash calculator 352 from the substance (binary code) of an application 351 to calculate a hash value 353. Examples of the hash algorithm include SHA-1 and SHA-2 standardized by FIPS PUB 180-1 and 180-2, respectively.

2. The AIT generation unit 350 combines (354) the XML-AIT of the application 351 with the hash value 353 to generate an XML-AIT 355 with a hash value.

3. The AIT generation unit 350 requests authentication from a broadcast station CA (Certificate Authority) 800 for the application 351 and the XML-AIT 355.

The broadcast station CA 800 receives the request for authentication related to the use of a broadcast resource from the broadcast station 12, and performs the requested operation. The broadcast station CA 800 checks the content of the application 351 and the XML-AIT 355 being targets of the authentication requested from the application employer 20, and sets the private key out of a pair of the private key and the public key issued by a route CA 900 to a signature generator 356 as a signature generation key if everything is satisfactory. The signature generator 356 uses a hash function for signature on the XML-AIT 355 with a hash value to generate a digest, and encrypts the digest with a signature generation key (private key) 357 to generate an XML signature 358. The broadcast station CA 800 returns the generated XML signature 358 to the application/AIT server 24.

4. The AIT generation unit 350 of the application/AIT server 24 adds (359) the XML signature 358 returned from the broadcast station CA 800 to the XML-AIT 355 with a hash value to generate an XML-AIT 360 with an electronic signature.

5. The AIT generation unit 350 of the application/AIT server 24 provides the XML-AIT 360 with an electronic signature to the reception terminal 32. It should be noted that the public key corresponding to the private key used to generate the XML signature 358 is provided to the reception terminal 32 on another route, and a signature verification unit 708 of the reception terminal 32 holds the public key.

The signature verification unit 708 of the reception terminal 32 performs the following processing.

1. The signature verification unit 708 uses a predetermined hash calculator 751 (hash function) from the substance (binary code) of an application 351 acquired from the application/AIT server 24 to calculate a hash value 752. The hash function used here needs to be the same as that of the hash calculator 352 of the AIT generation unit 350 of the application/AIT server 24. In this regard, the signature verification unit 708 checks the hash algorithm described in the acquired XML-AIT 360 with an electronic signature, and determines whether or not it matches with the hash algorithm of the hash calculator 751 (hash function). In the case where the inconsistency of the hash algorithm is determined, the signature verification unit 708 switches the hash calculator 751 (hash function) to match it with that of the hash calculator 352 of the AIT generation unit 350 of the application/AIT server 24.

2. The signature verification unit 708 uses a hash comparator 756 to compare the hash value 353 with the hash value 752 extracted from the XML-AIT 360 with an electronic signature to acquire a result 757 of consistency/inconsistency.

3. The signature verification unit 708 extracts an XML signature from the XML-AIT 360 in a signature generator 753, uses a signature verification key (public key) 754 to verify the XML signature, and thus acquires a signature verification result 755.

In this way, generation of an electronic signature and a hash value in a server and verification of the electronic signature and the hash value in the reception terminal 32 are performed.

[Effects of Embodiment Etc.]

According to this embodiment, it is possible to use information related to a broadcast program in an application for each scene of the broadcast program, and to prevent an illegal reception terminal or application from acquiring and using the information related to the broadcast program. Specifically, the mechanism in which only the reception terminal 32 that has acquired a formal XML-AIT and application can acquire information needed to acquire affiliate information with regard to security is achieved.

In addition, according to this embodiment, the XML-AIT and the application are added with an electronic signature and supplied to the reception terminal 32, and the reception terminal 32 verifies the electronic signature at the time of execution of the application. Therefore, it is impossible to replace the affiliate tag ID of the XML-AIT with another one.

Modified Example

Although the embodiments based on the standards of HbbTV have been described, the present technology is not necessarily limited to the one based on the standards of HbbTV.

The present technology is not limited to the above-mentioned embodiments and various modifications can be made without departing from the gist of the present invention.

It should be noted that the present technology may also take the following configurations.

(1) A receiving apparatus including:
a broadcast reception unit configured to receive a broadcasting signal including a broadcast program and tag information, the broadcast program including at least one scene, the tag information including information that is transmitted temporally corresponding to each of at least one scene of the broadcast program and is necessary for acquiring related information related to the broadcast program;
an application controller configured
to acquire an application that uses the related information and an application information table in which at least identification information for identifying the tag information including information for controlling an operation of the application and information for identifying the related information used by the application is described, and
to control the operation of the application based on the application information table;
a tag information processing unit configured
to acquire the tag information based on the identification information described in the application information table from the received broadcasting signal,
to acquire the related information based on the tag information, and
to supply it to the application being executed.

(2) The receiving apparatus according to (1) above, in which
a first representative value representative of the application is described in the application information table and an electronic signature is attached to the application information table, the first representative value being determined by predetermined calculation from the application, and
the application controller is configured to verify the electronic signature attached to the acquired application information table.

(3) The receiving apparatus according to (1) or (2) above, in which
the tag information includes channel identification information for identifying a transmission channel of the related information, and
the tag information processing unit is configured to acquire the related information from the transmission channel identified by the channel identification information.

(4) The receiving apparatus according to (1) or (3) above, in which
the tag information includes location information on a network of the related information, and
the tag information processing unit is configured to acquire the related information based on the location information.

DESCRIPTION OF SYMBOLS 1 information processing system
10 broadcast employer
12 broadcast station
14 affiliate information server
20 application employer
22 application AIT generation apparatus
24 application AIT server
32 reception terminal
200 network
241 storage
242 delivery unit
321 broadcast interface
322 demultiplexer
323 video decoder
324 audio decoder
325 certificate reception processing unit
326 affiliate processing unit
327 application controller
328 communication interface
329 application engine
350 AIT generation unit
708 signature verification unit

The invention claimed is:

1. An information processing system comprising:
an application server that supplies an application to a broadcast station;
the broadcast station that determines whether or not the application supplied from the application server is allowed to be used, adds an electronic signature to the application when determines as allowed, and sends the application with the electronic signature back to the application server;
reception terminal circuitry that:
receives a broadcasting signal from the broadcast station, the broadcasting signal including a broadcast program and tag information, the broadcast program including at least one scene, the tag information including information that is transmitted temporally corresponding to each of at least one scene of the broadcast program and is necessary for acquiring related information related to the broadcast program;
acquires, from the application server, the application that uses the related information, the electronic signature, and an application information table, the application information table including at least (i) application name field for defining a name of the application, (ii) an application identification field defining an identification for uniquely identifying the application, and (iii) a control code field for defining a set of application control codes including at least (1) AUTO-START for automatically activating the application, (2) PRESENT for representing that the application is in an executable state during selection of service, (3) DESTROY for indicating that the application terminates processing, (4) PRE-FETCH for caching a file group associated with the application while the application is not started, (5) REMOTE for representing that the application is not in a current transport stream and can be acquired in a case where another stream is selected, (6) DISABLED for representing that the application cannot be activated, and (7) PLAYBACK-AUTO-START for indicating that the application is activated in the same way as the AUTO-START in a case where a receiver performs a reproduction from storage circuitry, and
controls an operation of the application based on the application information table;
acquires the tag information based on information described in the application information table from the received broadcasting signal;
acquires the related information based on the tag information; and
supplies the related information acquired to the application being executed.

2. The information processing system according to claim 1, wherein the tag information includes channel identification information for identifying a transmission channel of the related information, the reception terminal circuitry acquires the related information from the transmission channel identified by the channel identification information.

3. The information processing system according to claim 1, wherein the tag information includes location information on a network of the related information, the reception terminal circuitry acquires the related information based on the location information.

4. The information processing system according to claim 1, wherein a first representative value representative of the application is described in the application information table and the electronic signature is attached to the application information table, the first representative value being determined by predetermined calculation from the application, the reception terminal circuitry verifies the electronic signature attached to the acquired application information table.

5. The information processing system according to claim 1, further comprising:
broadcast station circuitry that transmits a broadcasting signal including the broadcast program and tag information, the broadcast program including at least one scene, the tag information including information that is transmitted temporally corresponding to each of at least one scene of the broadcast program and is necessary for acquiring related information related to the broadcast program.

6. The information processing system according to claim 5, wherein the broadcast station circuitry broadcasts the related information temporally corresponding to each of the scene.

7. The information processing system according to claim 1, further comprising:
the storage circuitry that stores the application that uses related information of the broadcast program transmitted by broadcasting and the application information table in which at least identification information for identifying tag information including information that is transmitted temporally corresponding to each of at least one scene of the broadcast program and is necessary for acquiring related information related to the broadcast program is described; and
delivery circuitry that delivers the application and the application information table stored in the storage circuitry via a network in response to a request from the reception terminal circuitry used by a user.

8. A receiving method, comprising:
supplying an application by an application server to a broadcast station;
determining, by the broadcast station, whether or not the application supplied from the application server is allowed to be used;
adding, by the broadcast station, an electronic signature to the application when determines as allowed;
sending, by the broadcast station, the application with the electronic signature back to the application server;
receiving, by reception terminal circuitry, a broadcasting signal from the broadcast station, the broadcasting signal including a broadcast program and tag information, the broadcast program including at least one scene, the tag information including information that is transmitted temporally corresponding to each of at least one scene of the broadcast program and is necessary for acquiring related information related to the broadcast program;
acquiring, from the application server, by the reception terminal circuitry, the application that uses the related information, the electronic signature, and an application information table, the application information table including at least (i) application name field for defining a name of the application, (ii) an application identification field defining an identification for uniquely identifying the application, and (iii) a control code field for defining a set of application control codes including at least (1) AUTO-START for automatically activating the application, (2) PRESENT for representing that the application is in an executable state during selection of service, (3) DESTROY for indicating that the application terminates processing, (4) PRE-FETCH for caching a file group associated with the application while the application is not started, (5) REMOTE for representing that the application is not in a current transport stream and can be acquired in a case where another stream is selected, (6) DISABLED for representing that the application cannot be activated, and (7) PLAYBACK-AUTO-START for indicating that the application is activated in the same way as the AUTO-START in a case where a receiver performs a reproduction from a storage;
controlling an operation of the application based on the application information table;
acquiring, by the reception terminal circuitry, the tag information based on information described in the application information table from the received broadcasting signal;
acquiring the related information based on the tag information; and
supplying the related information acquired to the application being executed.

* * * * *